L. P. & W. F. Dodge,

Double Acting Pump.

No. 3,29. Reissued Sept. 25. 1855.

N. PETERS, PHOTO-LITHOGRAPHER, WASHINGTON, D. C.

UNITED STATES PATENT OFFICE.

L. P. DODGE AND WM. F. DODGE, OF NEWBURG, NEW YORK.

IMPROVEMENT IN PUMPS.

Specification forming part of Letters Patent No. 9,777, dated June 7, 1853; Reissue No. 329, dated September 25, 1855.

*To all whom it may concern:*

Be it known that we, L. P. DODGE and WM. F. DODGE, both of Newburg, in the county of Orange and State of New York, have invented a new and useful Improvement in Pumps and Fire-Engines; and we do hereby declare the following to be a full, clear, and exact description of the same, reference being had to the accompanying drawings, forming a part of this specification, in which—

Figure 1:
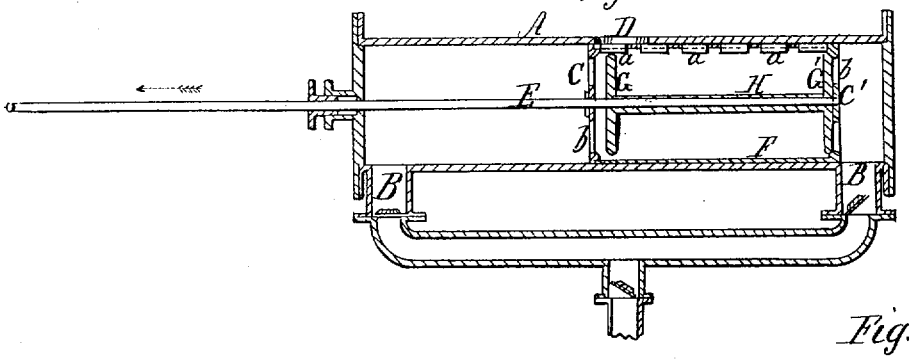
Figure 2:
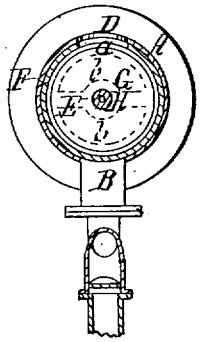
Figure 3:
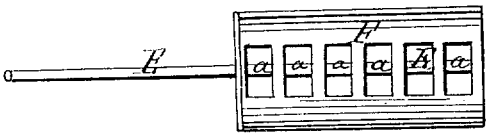

Figure 1 is a longitudinal section of our pump. Fig. 2 is a transverse section thereof. Fig. 3 is a view of the piston detached from the pump.

Similar letters of reference indicate corresponding parts in each of the several figures.

The description of pump or engine to which our invention relates may be distinguished as a double-acting lift or force pump.

The improvement consists in the mode of constructing the plunger, which is formed with two heads, which are kept a certain distance apart by a tube or by a rod or rods, and placed in a cylinder or chamber with closed ends, having an induction-pipe at each end covered with a proper valve, as is hereinafter more clearly described, and having also an opening at the center of the length of the cylinder for the egress of the water which passes through the piston-heads. (Said heads in their reciprocating movement do not pass the center opening, but work one on each side of it, a chamber being formed between them, communicating directly with the eduction opening, as clearly appears in the drawings.) Said piston-heads have valve-openings through them for the admission of water into the space between them, and are closed by a double valve, or valve for each piston-head, so that when one is open and passing water through from the end of the cylinder into the chamber between the piston-heads the other shall be closed to prevent its passing out in that direction, which forces it to pass off through the center eduction-pipe, by the compound resistance of the valve in the piston, and the valve in the induction-pipe, that prevents the egress of water in that direction.

To enable those skilled in the art to make and use our invention, we will proceed to describe its construction and operation.

A is the barrel, which is placed horizontally.

B B are the suction-pipes, entering the barrel at opposite ends, and both intended to connect together, so as to form one pipe. The valves in the suction-pipe, or at its entrance to the cylinder, are supposed to be the same as in other pumps.

D is the discharge-aperture in the middle of the cylinder. This may be furnished with an air-vessel.

C C are the piston-heads, which in the pump shown are to be the ends of a hollow cylinder, F, which is turned so as to fit easily within the pump-barrel, and requires no packing, and which is secured to the piston-rod E, so as to be incapable of turning or sliding thereon. On the upper side of the piston-cylinder F, opposite the discharge-aperture D, there is a passage or series of passages, *a*, to allow the water to pass out freely from the interior of the piston. The valves G G′ are the kind known as the "conical puppet-valve," fitting in conical seats in the inside of the piston-heads, and being connected together by the hollow tube or rods H, which slide easily over the rod E, forming what may be called a "spool-valve;" but other modifications may be made, using any well-known valve that will obviously be analogous, the object being to hold the valves at such a distance apart that when one is in its seat the other is just open wide enough to allow the free passage of the water, which is forced through the passage *b* in the pistons, and the purpose effected thereby is to secure the opening of one side of the plunger to the chamber at one end and close the other, reversing the openings when the motion of the piston is reversed.

In the drawings, Fig. 1, the pistons are supposed to be just commencing the stroke in the direction of the arrow shown near the rod, the valve G′ of the piston-head C′ being closed, and the water entering the barrel behind it, the valve G of the piston-head C being open, the water in front of G′ is being forced out through D, and that in front of the piston C rushing through to supply its place. When the pistons reach the end of the stroke and the movement is reversed, the valve G instantly closes and G′ opens, when the whole operation is reversed.

It will be understood that as both valves are connected both must operate at once, and therefore any delay on the part of either will be overcome by the other, and thus a more continuous operation is secured.

Instead of making the two piston-heads form parts of a hollow cylinder, they can be either attached securely to the rod at proper distances apart independently of each other, or secured together by a tube fitting to the rod E within the tube or rods H, or by any other convenient means. By this construction and arrangement of parts it is perceived that all the water passes in through the piston-heads and out between them through one opening, D, without the necessity of eduction-valves, partitions, or chambers between the piston-heads, and also without the leakage incident to many other pumps and the complication and liability to derangement thereof.

When the pump has the cylinder connected with the piston-heads in operation, the resistance of the water upon the interior of the cylindrical piston tends to expand the cylinder and keep its exterior surface in constant contact with the interior of the barrel, keeping the joint between them tight, while at the same time the barrel gives perfect support to the cylinder, and preserves it from being injured by the force requisite to expel the water. Thus the cylinder will expand, as it wears, by the pressure of the water, so as constantly to fit the barrel and render packing unnecessary as long as the cylinder lasts, and is protected from all danger of bursting by the support given by the barrel, and when the cylinder is worn out another can be substituted at trifling expense upon the same piston-heads. No wear comes upon the piston-heads, because the expansion of the cylinder causes it to take the friction. A cylinder thinner than paper would perfectly answer the purpose and the operation of the pump will be perfect until the cylinder is worn entirely through, and would work tolerably even then. It is advisable to attach the piston-heads firmly to the rod E, and is perhaps preferable to have one opening from end to end of the cylinder F, when used, at the side for the discharge of the water.

What we claim as our invention, and desire to secure by Letters Patent, is—

The combination of the cylinder or chamber A and the piston, constructed as herein described, with its valves, and the induction and eduction passages, so that the water all entering said cylinder under pressure alternately at its ends is discharged under pressure through the opening at its side, producing a constant and direct stream through the piston-heads from the cylinder, substantially in the manner and for the purpose set forth, thus dispensing with chambers and partitions in the barrel and valves at the eduction-port, preventing leakage and rendering the pump more simple and effective and less liable to derangement.

LEVI P. DODGE.
WM. F. DODGE.

Witnesses:
C. F. BELKNAP,
THOMAS GEORGE.